United States Patent [19]
Carter

[11] 3,727,955
[45] Apr. 17, 1973

[54] SEMIFLEXIBLE FLUID-TIGHT TUBE COUPLING

[76] Inventor: Efton T. Carter, 2737 Irwin, Lake Isabella, Calif. 93240

[22] Filed: Mar. 22, 1972

[21] Appl. No.: 236,949

[52] U.S. Cl..................................285/223, 285/368
[51] Int. Cl.................................................F16l 21/00
[58] Field of Search......................285/368, 233, 412, 285/414, 189, 223

[56] References Cited

UNITED STATES PATENTS

| 2,653,040 | 9/1953 | Galluppi | 285/233 X |
| 2,747,898 | 5/1956 | Wiltse | 285/414 X |
| 3,515,416 | 6/1970 | Pickert | 285/368 X |
| 3,627,357 | 12/1971 | Sanders | 285/368 X |

FOREIGN PATENTS OR APPLICATIONS

| 651,118 | 10/1962 | Canada | 285/368 |
| 1,119,305 | 6/1956 | France | 285/368 |
| 1,531,499 | 5/1968 | France | 285/368 |
| 277,647 | 9/1930 | Italy | 285/368 |

*Primary Examiner*—Dave W. Arola
*Attorney*—John Holtrichter, Jr.

[57] ABSTRACT

An apertured flange member with a beveled inner edge slidably disposed about a uniform cylindrical surface of a tubular member having an elongated axial bore and a circumferential recess immediately adjacent the tube's end extremity in which recess a resilient sealing ring is seated, and means for moving the flange member toward a second body arrangement to produce a fluid-tight (liquid or gas) communication between the bore and an opening in an end extremity of the second body arrangement by the action of the beveled edge urging only a portion of the sealing ring beyond its seat and toward and contacting the second body arrangement, whereby the sealing ring is compressed into an inescapable cavity formed by the beveled edge of the flange and the circumferential recess.

10 Claims, 5 Drawing Figures

PATENTED APR 17 1973 3,727,955
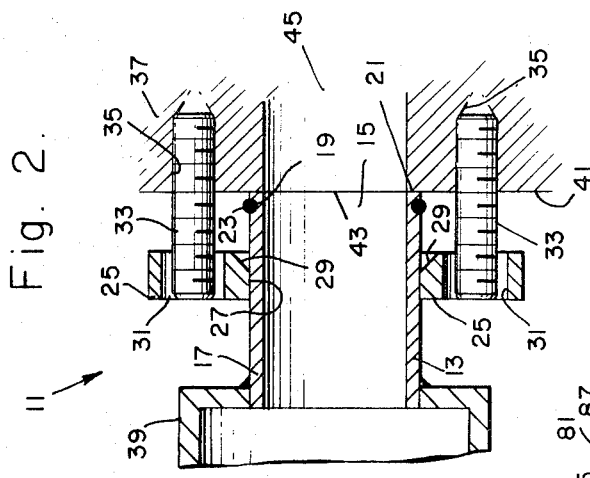
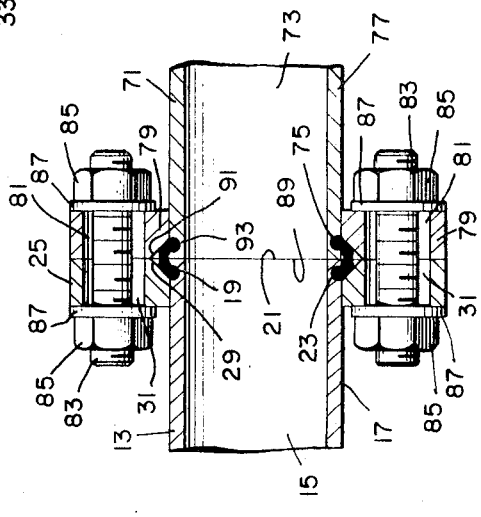
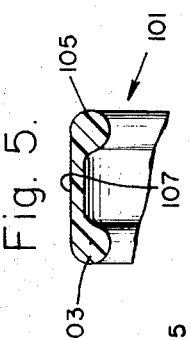
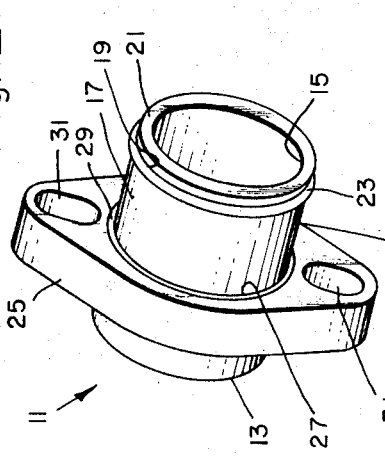
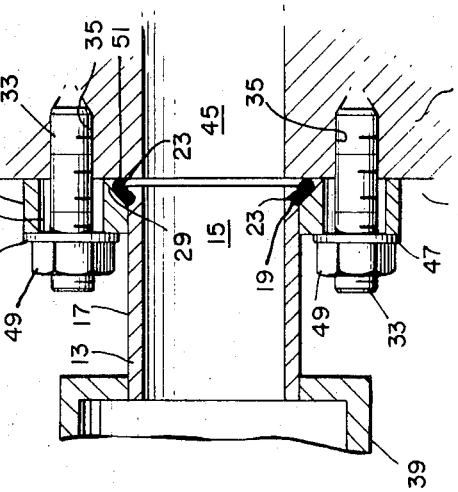

SEMIFLEXIBLE FLUID-TIGHT TUBE COUPLING

BACKGROUND OF THE INVENTION:

The background of the invention will be set forth in two parts.

1. Field of the Invention

The present invention pertains generally to the field of fasteners and more particularly to a fluid-tight tube coupling.

2. Description of the Prior Art

The use of O-rings as a sealing member to provide a fluid-tight coupling is well-known in the art. One technique used is to provide facing concave gasket-engaging end portions or flanges fixedly mounted on both bore carrying tubular members to be joined, an O-ring being simply rolled onto the uniform outer cylindrical surface of one of the tubes before the tubes are clamped together so that the seal is captured between the curved flanges.

In another scheme, two semicircular flanged clamp sections are bolted together at the junction of two threaded pipe sections, the clamp sections including a groove in which a cylindrical flange portion of a screw-positioned gland exerts pressure on stuffing material circumferentially disposed at the threaded pipe junction to seal same.

Still another pipe joint coupling arrangement seals the connection between male and female pipe ends by packing the annular space between the uniform outer circumferential surface of the female pipe or spigot end and the male-mouth pipe end with lead packing and the like and then forcing an O-ring mounted on the circumferential surface of the spigot end into the annular space opening by clamping an annular follower ring with a beveled ring contact face to the outer pipe's mouth end. Here, as with the other examples of the prior art previously described, the O-ring member is mounted directly on the uniform cylindrical surface of the pipe, which construction generally requires additional leak inhibiting packing and/or costly and sometimes fragile elaborate ring conforming matched ring flanges in order to provide a reliable fluid-tight joint.

Still a further scheme mounts a sealing ring in a very shallow circumferential recess in a reduced diameter portion adjacent a female pipe end so that the O-ring seal is forced out of the groove and back against the shoulder of the recessed portion by the action of the interface of the male or faucet portion of the joining pipe. In this case, the sealing ring is operationally positioned approximately midway between the over-lapped ends of the joined pipe, and there is no seal in the area where the spigot end face butts against the inner mating face of the faucet section. The compressive action on the O-ring is very severe and could lead to a malfunction if the seal is not rolled uniformly toward and against the shoulder portion of the spigot pipe section.

It should be evident from the foregoing that a new and improved technique for providing a fluid-tight pipe coupling which would be reliable and simple and economical to fabricate would constitute a significant advancement of the art.

SUMMARY OF THE INVENTION

In view of the foregoing factors and conditions characteristic of the prior art, it is a primary object of the present invention to provide a new and improved fluid-tight tube coupling.

It is another object of the present invention to provide a relatively simple, yet effective, fluid-tight tube coupling that is economical to fabricate.

It is still another object of the present invention to provide a very reliable fluid-tight tube coupling that operationally positions an O-ring seal into intimate contact with the outer surface of the tube upon which it is mounted, with the member arrangement to which the tube is joined, and with the apertured flange member disposed over the sealing element and attached to the joined member arrangement.

It is yet a further object of the present invention to provide a unique and highly advantageous fluid-tight tube coupling structure for mounting a carburetion unit to an engine fuel mixture intake manifold and the like.

It is a further object of the present invention to provide a fluid-tight tube coupling which allows a limited degree of lateral movement of the tube without endangering the integrity of the coupling for liquids or gases.

According to one embodiment of the present invention, a fluid-tight tube coupling device is provided which includes a resilient sealing ring seated in a circumferential sealing ring seat situated substantially immediately adjacent an end extremity and in a uniform outer cylindrical surface of a tubular member having an elongated axial bore. A flange member having an aperture therethrough is slidably disposed about the tubular member's outer cylindrical surface, the flange member having a beveled edge with a truncated conical surface portion disposed about the aperture and facing toward the end extremity of the tubular member, and a second body arrangement which includes an opening in its end extremity. The device further includes attachment means cooperating with the flange member and the second body member for moving the flange member toward the second body member and joining together the end extremities with the bore communicating with the second body arrangement's opening, the beveled edge portion contacting and urging only a portion of the resilient sealing ring beyond the sealing ring seat toward and into contact with the second body arrangement to provide a fluid-tight seal between the extremities and the flange member.

The second body arrangement may be a tubular member similar to the member to be joined, or it may be of another configuration such as an engine block with an appropriate bore opening in its facing end extremity.

The features of the present invention which are believed to be novel are set forth with particularity in the appended claims. The present invention, both as to its organization and manner of operation, together with further objects and advantages thereof, may best be understood by making reference to the following description taken in conjunction with the accompanying drawings in which like reference characters refer to like components in the several views.

BRIEF DESCRIPTION OF THE DRAWINGS

FIG. 1 is a perspective view of a semiflexible fluid-tight coupling device constructed in accordance with the present invention;

FIG. 2 is a sectional view along the longitudinal axis of the tubular member seen in FIG. 1, prior to being bolted to a block;

FIG. 3 is a view of the device seen in FIG. 2 after being bolted to a block;

FIG. 4 is a sectional illustration of another embodiment of the present invention showing the fluid-tight coupling of two identical tubular members; and FIG. 5 is a view, in section, of a double O-ring seal element in accordance with still another embodiment of the present invention.

DESCRIPTION OF THE INVENTION:

Referring now to the drawing and more particularly to FIG. 1, there is shown a fluid-tight tube coupling device 11 with a metal or plastic tubular member 13 having an elongated axial bore 15 and a uniform outer cylindrical surface 17 except for a circumferential recess sealing ring seat 19 substantially immediately adjacent and end extremity 21. A conventional rubber, plastic or neoprene O-ring sealing element 23 is seated in the recess 19, and a flange 25 having an aperture 27 therethrough is slidably disposed about the outer cylindrical surface 17, the flange member 25 including a beveled edge portion 29 facing toward the end 21.

In the embodiment of the invention seen in FIGS. 2 and 3, the flange member 25 is provided with oppositely disposed apertures 31 adapted to register with and receive standard threaded studs 33 threadably engaged in holes 35 in a block body member 37. The flange may be attached to another body such as a carburetor 39, for example, by any conventional technique such as welding, brazing, mating threaded portions and the like, or, the tube and the body may be integrally formed.

FIG. 2 illustrates the position of the flange member 25 in relation to the sealing ring 23 prior to the ring being forced against an end extremity 41 of the body member 37. It can also be seen from this figure that the bore 15 of the tubular member 13 is axially aligned with an opening 43 in the end extremity 41 of and leading to a bore 45 in the block body member 37. In order to provide a fluid-tight seal at the junction of the bores 15 and 45, washers 47 are suitably positioned on the studs 33 and nuts 49 are threadably engaged and tightened down to force the flange member 25 against the block's end extremity 41, as illustrated in FIG. 3. This action causes the beveled edge portion 29 to uniformly contact and urge an upper portion 51 of the sealing ring element 23 beyond the ring seat 19 and toward and into sealing contact with the block body member 37, namely in this embodiment, with the end extremity 41. Thus the coupling device 11 and the body member 37 are locked together with the tubular member 13 under lateral restraint of the compressed resilient seal element 23. Accordingly, the coupling is semiflexible since the tube's end extremity 21 may move a small distance from the block's end extremity 41, as seen in FIG. 3.

The edge of the circumferential recess 19 adjacent the tube's end extremity 21 is spaced from the extremity 21 by a distance less than the cross sectional diameter of the resilient sealing element 23, and preferably by a distance less than the cross sectional diameter of the resilient sealing element 23, and preferably by a distance approximately equal to the cross sectional radius of the ring element 23. It is likewise preferable that the angle made with the longitudinal axis of the bore 15 or surface 17 by the beveled edge portion 29 is approximately 45°. Further, when the end extremities 21 and 41 are butted against each other, the edge of the portion 29 immediately adjacent the outer cylindrical surface 17 should not be further from the extremity 21 than the edge of the recess 19 farthest from the end 21, and should not overlap more than one-half the recess width.

With reference to FIG. 4, there is shown another embodiment of the invention. Here, tubular member 13 is coupled to a similarly constructed second tubular member 71 having a bore 73, a circumferential sealing ring receiving groove 75 in a uniform outer cylindrical surface 77, and a flange member 79 with apertures 81 therethrough. Elongated threaded rods or studs 83 are disposed through the apertures 81 and 31 in the flanges 79 and 25, respectively, and the latter joined by appropriate threaded nuts 85 and washers 87. In this manner, the end extremity 21 of the member 13 is forced against an end extremity 89 of the member 71 with the bores 15 and 73 axially aligned and in full communication with each other.

The flange member 79 is also provided with a beveled edge portion 91 similar to the portion 29 which urges a second resilient O-ring sealing element 93 toward the end extremity 89 and into contact with the first ring sealing element 23 to seal the junction of these tubular members. It will be noted that the beveled edges 19 and 91 can be considered as truncated conical surfaces with their bases at the end extremities 21 and 89, respectively.

In still another embodiment of the invention, the two sealing elements 23 and 93 in the pipe configuration seen in FIG. 4 may be replaced by a unitary, integrally molded, resilient circular sealing arrangement 101 having spaced O-ring portions 103 and 105 joined by a web portion 107, as shown in FIG. 5.

Although certain materials and processes have been described for use in fabricating the various embodiments of the invention, it should be clear that the materials and processes utilized are not critical and any material and process generally considered to be suitable for a particular element or function may be substituted for those specifically identified. The term "fluid-tight" as used herein applies to both liquids and gases and combinations of these.

From the foregoing, it should be evident that a very advantageous and novel fluid-tight tube coupling device has been described which constitutes a significant advancement of the art. Although only a limited number of embodiments of the invention have been described in detail, it should be understood that modifications and other embodiments of the invention may be made using the teachings of this invention.

Accordingly, it is intended that the foregoing disclosure and showings in the drawings may be considered only as illustrations of the principles of the present invention.

What is claimed is:

1. A semiflexible fluid-tight tube coupling device, comprising:
   a first tubular member having an elongated axial bore and a uniform outer cylindrical surface except for a first circumferential recess sealing ring seat substantially immediately adjacent an end extremity thereof;
   a second body arrangement including an opening in an end extremity thereof;

a first resilient sealing ring seated in said circumferential recess;

a first flange member having an aperture therethrough slidably disposed about said outer cylindrical surface, said flange member including a beveled edge portion about said aperture facing toward said end extremities; and attachment means cooperating with said first flange member and said second body member for moving said flange member toward said second body member and joining together said end extremities with said bore communicating with said opening said tubular member, sealing ring, circumferential recess, first flange member, second body arrangement and attachment means all being so constructed and arranged that, said beveled edge portion contacts and urges only a portion of said resilient sealing ring beyond said sealing ring seat toward and into sealing contact with said second body arrangement to provide a fluid-tight seal between said end extremities and said flange member.

2. The tube coupling device according to claim 1, wherein said attachment means includes a pair of first attachment arrangements disposed in said first flange member on opposite sides of said bore, and also includes a pair of second attachment arrangements disposed in said second body arrangement on opposite sides of said opening and registering with said first attachment arrangement.

3. The tube coupling device according to claim 2, wherein said second body arrangement is a block and said end extremity thereof is planar, and wherein said opening communicates with a bore in said block.

4. The tube coupling device according to claim 3, wherein said pair of second attachment arrangements are threaded studs extending orthogonally from said planar end extremity, and wherein said first attachment arrangements are holes and associated threaded nuts, said studs extending through said holes and threadably engaging said nuts.

5. The tube coupling device according to claim 2, wherein said second body arrangement includes a second tubular member having an elongated bore communicating with said opening and having a uniform outer cylindrical surface except for a second circumferential recess sealing ring seat immediately adjacent said end extremity thereof, and also includes a resilient sealing ring seated in said second circumferential recess, and further includes a second flange member having a second aperture therethrough slidably disposed about said second cylindrical surface and having a beveled edge portion about said second aperture facing toward said end extremities.

6. The tube coupling device according to claim 5, wherein said pairs of first and second attachment arrangements are holes and associated threaded nuts, and wherein said attachment means also includes a threaded stud extending through said holes and threadably engaging said nuts.

7. The tube coupling device according to claim 1, wherein the circumferential edge of said circumferential groove adjacent said end extremity is spaced from said end extremity by a distance not greater than the cross sectional radius of said sealing ring.

8. The tube coupling device according to claim 1, wherein said circumferential recess is semi-circular in cross section and has a cross sectional radius not greater than that of said sealing ring.

9. The tube coupling device according to claim 5, wherein said first and second sealing rings are joined by an integral web portion therebetween.

10. The tube coupling device according to claim 1, wherein said beveled edge portion defines a truncated conical surface making approximately a 45° angle with respect to the axis of the cone.

* * * * *